United States Patent [19]

Juhas

[11] 4,395,828
[45] Aug. 2, 1983

[54] COMBINATION GEODETIC TRANSIT COMPASS AND SIGNAL MIRROR

[75] Inventor: Allan P. Juhas, Lakewood, Colo.

[73] Assignee: Texasgulf Inc., Stamford, Conn.

[21] Appl. No.: 168,246

[22] Filed: Jul. 10, 1980

[51] Int. Cl.³ ............................................. G01C 17/20
[52] U.S. Cl. .................................. 33/272; 33/275 R; 33/348; 116/20; 350/98
[58] Field of Search ..................... 33/272, 275 R, 273, 33/348, 355 R; 116/20; 350/97, 98, 100

[56] References Cited

U.S. PATENT DOCUMENTS

| | | | |
|---|---|---|---|
| 823,373 | 6/1906 | Tatum | 33/275 R |
| 1,042,079 | 10/1912 | Brunton | 33/272 |
| 2,358,589 | 9/1944 | Piffath | 33/272 X |
| 2,557,108 | 6/1951 | Hunter | 116/20 |
| 3,164,124 | 1/1965 | Ehrsam | 116/20 |

Primary Examiner—William D. Martin, Jr.
Attorney, Agent, or Firm—Denis A. Polyn

[57] ABSTRACT

A geodetic compass having a mirrored cover that has the dual purpose of providing means for reading the compass needle orientation for geodetic purposes, while at the same time having cross hatch diffractional sighting means incorporated in said cover and mirror for utilizing said mirror for emergency signalling purposes.

5 Claims, 3 Drawing Figures

U.S. Patent  Aug. 2, 1983  4,395,828
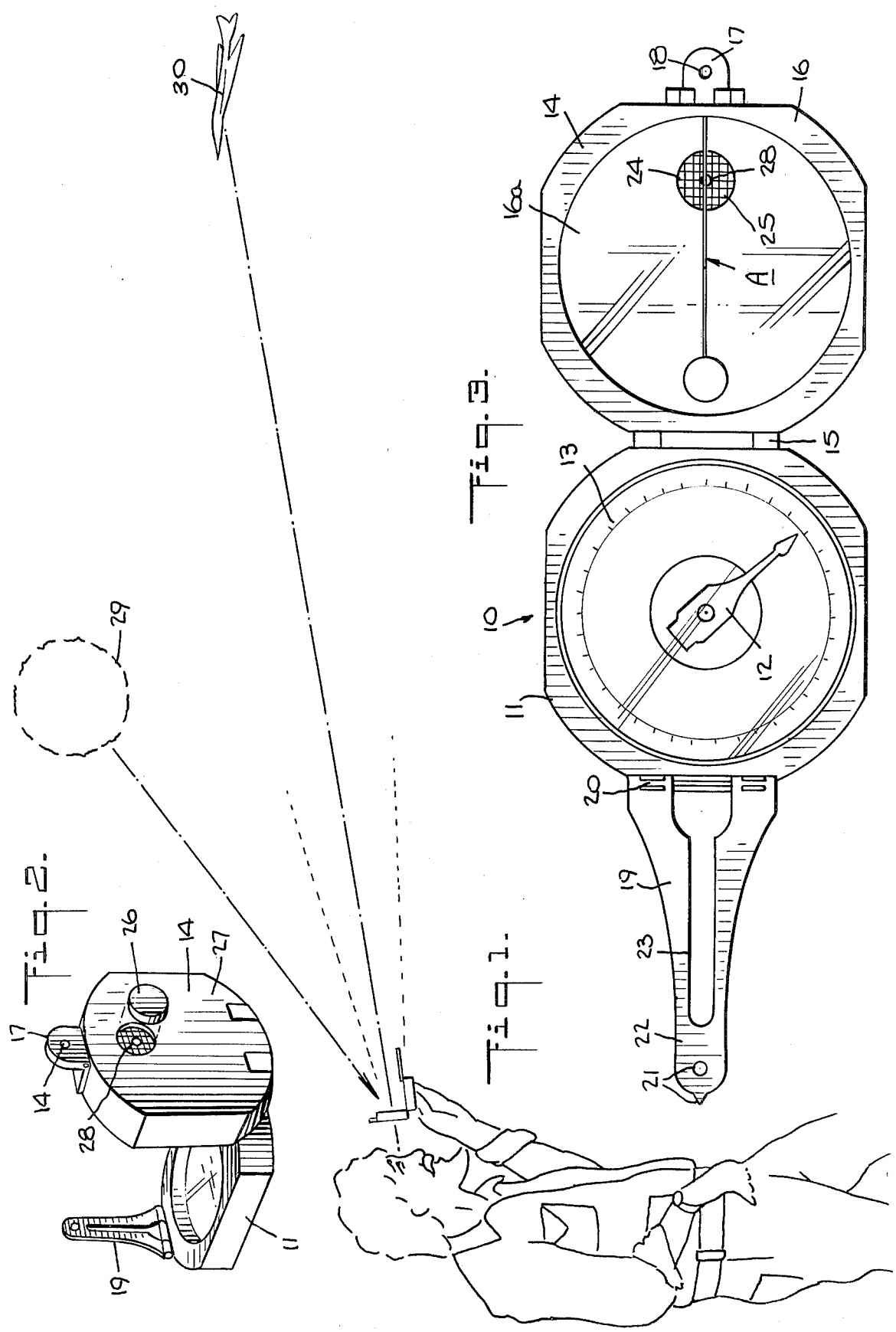

COMBINATION GEODETIC TRANSIT COMPASS AND SIGNAL MIRROR

BACKGROUND OF THE INVENTION

Geodetic transit compasses have been known for many years and have been developed to a high degree of precision, reliability and durability. Such apparatus are used in military manuevers, claim staking (oil, gas, mining, etc.), determining vertical and horizontal angles, grading roads and fields, geological field work, above and below ground surveying, topographic mapping, setting timber cutting lines, use as a prismatic compass, use as a level or plumb bob, and the like. Such compasses are widely used by exploration geologists, surveyors, mining engineers, hikers, and in the military.

Exploration geologists use such devices in searching for ore deposits, etc. frequently in remote areas involving helicopter supported operations whereby the geologist is located from the air and picked up for transfer to a new work area or return to the base of operations. In for example, deep valleys and canyons, only a few seconds are provided for signalling to the helicopter from the ground, and ordinary relective devices have proven essentially unreliable for establishing contact, on the order of about a one percent (1%) success ratio, assuming the sun is shining and in line with the geologist on the ground. Attempts to use the compass mirror for such emergency signalling usually involved more than a few seconds to align and in any event was pure chance that proper alignment was even achievable within any time frame.

The United States Navy developed a generally rectangular signalling mirror for such signalling purposes utilizing a so-called diffraction sighting principle which involves a central circular aperture in the mirror having an annular rectangular wire mesh insert therein which when held to the eye with the mirrored surface facing outwardly from the eye of the observer, enabled alignment of the reflective sun's rays with a distant target such as a relatively fast moving plane or helicopter or ship in a fraction of a second with effective regularity. Such signalling mirror has also proved effective in light cloud cover or hazy weather.

The problem involved with use of such a mirror by a geologist or the like was that in deep valleys or canyons, so few seconds were available for signalling a fast moving plane or helicopter, valuable time was lost and often times the signalling opportunity was lost due to the necessity to search for and unwrap the fragile signalling mirror.

Another problem was that two separate devices were required which enhanced the possibility of misplacement or loss of the mirror. Also, the Navy-type signal mirror is very fragile and has to be carefully wrapped, therefore it is not always immediately accessible.

As will be seen hereinafter, the present invention provides a compact reliable combination of features in apparatus having utility not only for use as a geodetic compass but also as an emergency signalling mirror which is disposed in a protected but readily available condition for use.

BRIEF SUMMARY OF THE INVENTION

A geodetic compass is provided having the conventional base member carrying the magnetic directional needle and a cover hinged to the base having a front sight means on its outer edge and a mirrored surface in its inner surface. A hinged rear sight means is disposed on the opposite edge of the base member for utilization with the cover in the conventional directional sighting employment of the compass.

Included in the cover is an offset aperture extending through the cover and its mirrored surface within which is a rectangular wire mesh diffraction grid, preferably having a hole in the center thereof. The grating is disposed in the aperture in recessed condition and a protective transparent lid or wafer is provided to retain and protect the grid when the cover is in the closed condition relative to the base member.

BRIEF DESCRIPTION OF THE DRAWINGS

FIG. 1 is a top plan view of a geodetic compass with the rear sight and cover opened flat;

FIG. 2 is a reduced isometric view of the compass with the rear sight and cover in operative position for use as a compass; and FIG. 3 is a schematic showing use of the apparatus as a signalling mirror.

DETAILED DESCRIPTION

Referring now to the drawings, particularly FIG. 3, a geodetic transit/compass is shown and designated generally by reference number 10. It has base member 11 housing magnetic compass needle 12 rotatably disposed therein to operate in conjunction with calibrated peripheral scale 13. Cover 14 is connected to base 11 with suitable hinge means 15 and at its outer end 16 carries front sight means 17 with sighting aperture 18. Inner surface of cover 16 is constituted by mirrored surface 16a.

Rear sight means 19 is connected to base 11, at the opposite side of base member 11 from that to which cover 14 is attached, by hinges 20 and carries sighting means 21 at its outer or free end 22. Elongated opening 23 in rear sight means 19 enables reading the compass needle orientation in mirrored surface 16a when using the device for directional purposes or the like with the components arranged as shown in FIG. 2. A typical such conventional apparatus is shown and generally described in *Geotimes,* Aug. 1979, at page 10, such disclosure being hereby incorporated by reference.

Also included in cover 14 is circular opening or aperture 24 which extends entirely therethrough. Such aperture 24 is offset from the geometric center A of mirrored portion 16a. Disposed in aperture 24 in recessed condition is a flat annular rectangular wire mesh grid or insert 25 which may be permanently retained therein in any suitable well-known manner. Transparent disc or lid 26 (see FIG. 2) is inserted into the aperture from the outer surface 27 of the cover 14 to help retain and to protect grid 25 from abrasion or other damage during the useful life of the apparatus. The grid 25 and protective lid 26 form a cross hatch sight means which is adapted for reflective alignment of the mirrored surface 16a with a distant target for signalling purposes.

The compass can be constructed of any well-known materials such as aluminum, anodized aluminum, etc. Sapphire needle bearing supports and alnico magnets may also be used to provide a reliable instrument as is known by those skilled in the art of compass design and manufacture.

The grid 25 in one embodiment is made of 32 to 40 mesh stainless steel wire and protective disc 26 may be glass or other durable, scratch-resistant transparent material. Aperture 24 may conveniently be the size of a dime or one cent U.S. coin and the central sighting hole 28 in grid 25 may be on the order of one-quarter inch in diameter. The hole 28 can be eliminated and a circular screen employed without a hole, but the hole 28 provides better vision in sighting the mirror with a distant target.

When using the device as an emergency signalling mirror, the apparatus is arranged as shown in FIG. 1, namely the compass cover is opened up flat, 180° to the compass body although sight 19 may be folded against the base, so that the body of the compass does not interfere with either the incident or reflected sun's rays and the device 10 held with the cover 14 adjacent the eye of the user with mirrored surface 16a pointing outwardly therefrom in reflective contact with the sun 29.

Initially the mirror i.e. mirrored surface 16a is oriented so as to reflect the sunlight from the mirror into a nearby surface. Then the device is brought slowly up to eye level as shown in FIG. 1 and the person looks through the sighting hole 28 whereupon he sees a bright light spot (not shown) which is the aim indicator. The cover is held close to the eye and is turned slowly and manipulated so that the bright spot is on the target 30, in which position the sunlight reflection from the mirror can be seen by the target 30.

As can be seen from the above description, a new utilitarian dimension of communication is provided for a geodetic compass/transit, or similar apparatus with more efficient accessibility of a signalling device, greater utility and protection for the diffraction phenomena grid sighting device, and a more unitary and compact device. It provides a device particularly adapted for use by engineers, geologists, hikers, campers and the military.

While one embodiment of the invention has been shown and described herein, it is to be understood that changes and additions may be made by those skilled in the art without departing from the scope and spirit of the invention.

What is claimed is:

1. A geodetic compass and signal device comprising a base member housing a rotatable magnetic compass needle and including a calibrated peripheral scale; a cover hinged to said base member, said cover including a front sight means having a sighting aperture, a mirror in facing relation to the compass needle, an aperture extending through said mirror and said cover, and a rectangular mesh diffraction grid in said aperture for reflective alignment of said mirror with a distant target for signalling purposes; and a rear sight means hingedly connected to said base member opposite said cover, said rear sight means including a sighting means and an elongated opening therein for reading of said compass needle in said mirror for sighting purposes.

2. The device as set forth in claim 1 wherein said grid is a light diffractive rectangular wire grid and which further comprises a transparent protective lid overlying said grid on the outside of said cover.

3. The device as set forth in claim 1 wherein said grid has a flat annular shape with a centrally disposed sighting hole in the center thereof.

4. The device as set forth in claim 3 wherein said apertured portion is offset from the geometric center of said mirror.

5. The device as set forth in claim 4 wherein said grid is comprised of a stainless steel wire screen of about a 40 mesh size and said lid is glass.

* * * * *